United States Patent [19]

Dozsa

[11] Patent Number: 4,681,644

[45] Date of Patent: Jul. 21, 1987

[54] ACCELERATOR FOR GYPSUM PLASTER AND PROCESS OF MANUFACTURE

[75] Inventor: Otto L. Dozsa, Palos Heights, Ill.

[73] Assignee: USG Corporation, Chicago, Ill.

[21] Appl. No.: 780,921

[22] Filed: Sep. 27, 1985

[51] Int. Cl.[4] .................. B32B 31/06; B32B 13/00
[52] U.S. Cl. .................................. 156/39; 106/114; 428/703
[58] Field of Search .................. 106/114; 156/39; 428/703

[56] References Cited

U.S. PATENT DOCUMENTS 3,813,312  5/1974  Kinkade et al. .................. 156/39

Primary Examiner—Robert A. Dawson
Attorney, Agent, or Firm—Kenneth E. Roberts; Robert H. Robinson; Robert M. Didrick

[57] ABSTRACT

A setting accelerator for calcined gypsum plaster and a process for its preparation are disclosed. The accelerator comprises finely ground calcium sulfate dihydrate having composite coatings on the particles of firstly a calcination inhibiting material such as sugar and secondly a coating of aluminum sulfate hydrate. The accelerator is particularly useful in the formation of gypsum wallboard.

16 Claims, 2 Drawing Figures

ACCELERATOR FOR GYPSUM PLASTER AND PROCESS OF MANUFACTURE

BACKGROUND OF THE INVENTION

1. Field of the Invention

The present invention relates to the process of setting a calcined gypsum slurry, and is more particularly concerned with a composition for accelerating the setting of an aqueous calcined gypsum slurry, such as in the formation of gypsum wallboard.

When freshly calcined gypsum, usually referred to as calcium sulfate hemihydrate or plaster of Paris, is mixed with water to a plastic consistency, it combines with some of the water to form calcium sulfate dihydrate and sets to a hard solid mass in about 30 minutes without the addition of set-influencing additives. The setting time, however, changes with the age of the plaster after its manufacture. After a very short interval, the setting time first begins to lengthen and then generally speeds up in an erratic and unpredictable fashion.

Gypsum board has long been a large volume commercial article of commerce. In the manufacture of gypsum board, a calcined gypsum aqueous slurry and desired additives are blended in a continuous mixer, as for example described in U.S. Pat. No. 3,359,146. The mixed slurry is continuously deposited upon a cover sheet moving beneath the mixer and a second cover sheet is applied thereover. The sandwiched slurry, as a continuous strip, is conveyed on a belt until the calcined gypsum has set; then, the strip is cut to form boards of desired length which are conveyed through a drying kiln to remove excess moisture. The time at which the board may be cut, or in other words the speed of the conveyor and the consequent rate of production of the gypsum board, is generally controlled by the setting time of the calcined gypsum slurry. Thus, conventional adjuvants to the calcined gypsum in the mixer generally include set time control agents, particularly accelerators. These and other additives such as pregenerated foam to control final density of the board, cover sheet bond promoting agents, fibrous reinforcements, consistency reducers and the like constitute less than 5%, and usually less than 2%, of the weight of the finished board core.

In a related area of manufacture, formulated building plasters of calcined gypsum are often bagged while still at elevated temperatures immediately following the calcination of the gypsum. Under these conditions, many set control additives deteriorate, so that they do not perform reliably. Storage conditions, particularly humidity and temperature, further adversely affect the performance of some accelerators.

2. Prior Art

The most common accelerator used for reducing the setting time of calcined gypsum is calcium sulfate dihydrate that has been ground to a high degree of fineness. When freshly prepared, it has high potency. However, when stored prior to use, particularly in the presence of moisture or heat, it loses its effectiveness. King in 1935 disclosed a way around this, in U.S. Pat. No. 1,989,641. He there proposed adding to the calcined gypsum certain amounts of lime and aluminum sulfate, along with a commercial retarder, to generate in situ a precipitated calcium sulfate dihydrate to act as seeding agent to accelerae the set of the plaster. Thereafter, King disclosed in U.S. Pat. Nos. 2,078,198 and 2,078,199 improved accelerators, comprising calcium sulfate dihydrate intermixed with sugar, which were less subject to aging deterioration. U.S. Pat. No. 3,573,947 subsequently disclosed a method for improving the sugar-coated accelerator employing a final finishing step of heating the co-ground sugar and calcium sulfate dihydrate mixture under conditions which permit a certain amount of calcination to take place to further stabilize the accelerator.

While all of these patents call for samll amounts of the accelerator to be used, as little as 1 pound per ton of plaster, about 20 pounds per ton or more is preferred in commercial manufacturing operations. Individual gypsum deposits vary in purity and the need for an accelerator correspondingly varies on different plant equipment, with some calcined gypsums requiring much larger amounts than others to maintain gypsum board line speed. Thus, there remains a need for an improved accelerator which has a higher degree of activity per unit of weight, may use less sugar, and exhibits little change in accelerative characteristics when exposed to storage, particularly high relative humidities and high temperatures. Thus, it is an object and advantage of the present invention to provide an accelerator for calcined gypsum which is extremely active in that it induces considerably faster set acceleration, is extremely efficient in that lessened amounts may be used to achieve the same levels of effectiveness as prior accelerators, and is storage stable. Other objects and advantages will become apparent from the ensuing description.

SUMMARY OF THE INVENTION

It has now been found that highly potent accelerative effects are achieved with a calcium sulfate-based, composite acceleraor having multiple coatings. The accelerator is prepared by first coating freshly ground calcium sulfate particles with a calcination inhibiting material, such as by co-grinding or milling high grade calcium sulfate dihydrate with sugar. Thereafter, about 10–40% by weight of aluminum sulfate hydrate is applied to the sugar-coated dihydrate, based upon the weight of the total accelerator composition to bring about a consolidation between the individual particles. The aluminum sulfate hydrate may be applied to the sugar-coated dihydrate during its preparation by co-grinding or milling. However, the timing of the aluminum sulfate hydrate addition during the milling operation is important in that it must follow the substantial completion of the sugar coating of the dihydrate. Further, it has been found that simultaneous milling of the three ingredients, or simply blending fine aluminum sulfate hydrate powder into a milled mixture of sugar and dihydrate are ineffective in providing improved accelerator performance.

DETAILED DESCRIPTION OF THE PREFERRED EMBODIMENTS

Figure 2:
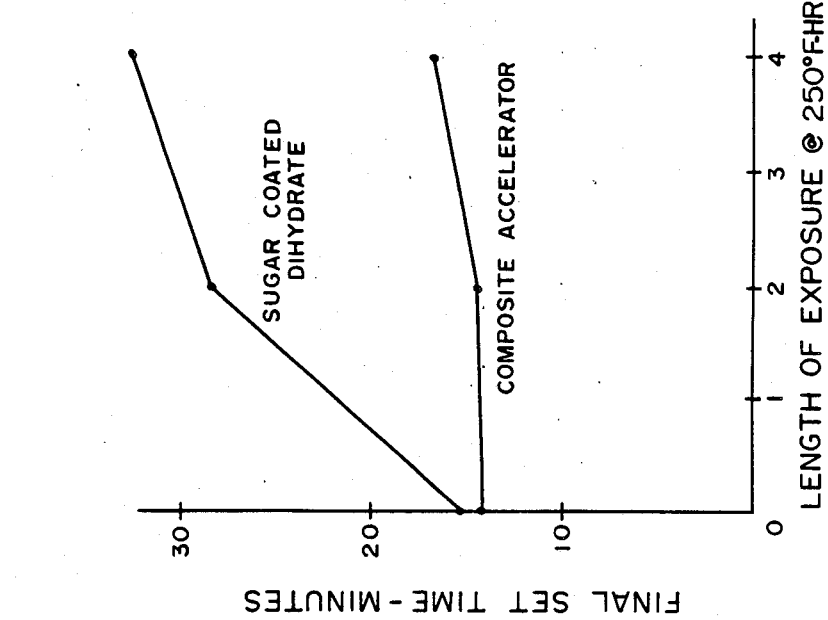
FIG. 2 sets forth the effect of heat exposure upon the potency of standard sugar-coated gypsum accelerator and the composite accelerator of the invention, showing final set time in minutes versus length of exposure at 250° F. in hours.

The calcium sulfate core ingredient may be any natural or chemical gypsum dihydrate material of either high or low grade and of appropriate feed size for grinding. The dihydrate material may be high grade land plaster, e.g. 80 weight% dihydrate or better. It may be low grade land plaster and mostly anhydrite and materials that include variable amounts of impurities and inert materials without substantial detriment to its usage herein except that impurities detrimental to the setting of calcined gypsum, such as phosphoric acid, are to be avoided or minimized. The dihydrate may contain considerable amounts of anhydrite, sand or clay and the like without significant impairment of accelerator activity. The feed material may be preground as needed to a feed size that will result in average particle size of a minimum of about 7000 square centimeters per gram Blaine after treatment in accordance with the present invention.

The first coating material may be any of those conventional calcination inhibiting materials well known in the art. For example, but without limitation, various sugars, glycerine, glycols, starches, anionic or nonionic detergents, lignin or lignosulfonates and mixtures thereof may be used, with or without the further addition of boric acid. For reasons of economy, effectiveness and availability, sugar is the preferred first coating material. The sugar may be sucrose, dextrose or amylose, but sucrose is generally preferred for reasons of availability and economy. The calcination inhibiting agent such as sugar will constitute about 5%-15% by weight of the calcium sulfate dihydrate. When the dihydrate employed contains considerable relatively inert extender material such as sand or calcium sulfate anhydrite, the percentage of calcination inhibiting agent based on the weight of the dihydrate present may be much larger and may range upwards to about 45-50% by weight of the dihydrate then present.

The coating of the dihydrate with the calcination inhibiting agent may conveniently be done in a ball mill and should be accomplished by abrading or grinding action sufficient to produce a relatively high surface area when determined with the Blaine air permeability apparatus as described in American Standard Testing Methods test C-204: and preferably, product milling with the calcination inhibiting agent should produce a Blaine surface area of more than 6000 square centimeters per gram, preferably 7000 or more. The milling operation involves not only grinding to achieve size reduction but the action of the hammer, balls, rods or other mechanism of an appropriate impactor mill promotes an intimate association between the calcination inhibiting agent and the calcium sulfate dihydrate causing a coating or sealing of the dihydrate particle surface.

The second additive material comprises aluminum sulfate hydrate, $Al_2(SO_4)_3.nH_2O$ where n is an integer from 6 to 18, preferably the higher hydrates such as of 14-18, commonly referred to as concentrated alum or papermakers's alum. The aluminum-potassium double salt, or common alum, may also be used. The amount of the second additive material is generally variable from about 5% to about 55% by weight of the composite accelerator, although amounts of about 10-40% are preferred.

The second milling operation like the first involves an impacting action that promotes an intimate contact between the aluminum sulfate hydrate and the coated dihydrate particles such that the sugar-coated dihydrate becomes consolidated with the aluminum sulfate particles. In the first milling step the dihydrate is coated with the calcination inhibitor material. Thereafter in the second milling step the sugar-coated gypsum becomes consolidated with the aluminum sulfate.

The product of this process is a composite accelerator particle, composed of calcium sulfate dihydrate, calcination inhibiting agent and aluminum sulfate hydrate. The most likely configuration would be a particle of aluminum sulfate surrounded by the finer particles of calcium sulfate dihydrate, which latter are coated by a thin layer of calcination inhibiting agent such as sugar. The mechanism responsible for the increased accelerative potency is not clearly understood at present, however. Whether the sugar-coated dihydrate particles will be coated by a second layer of aluminum sulfate hydrate, or small sugar-coated calcium sulfate dihydrate particles will coat the surfaces of larger aluminum sulfate hydrate particles is not known. The important fact is that while the remilling of calcination inhibiting coated calcium sulfate dihydrate particles with aluminum sulfate hydrate will not result in significant changes in the average external specific surface as measured by the Blaine method, it will cause a drastic increase in the average total (external plus internal) specific surface area as measured by the B.E.T. method. The B.E.T. surfaces of gypsum particles co-milled with calcination inhibiting agents, such as sugar for example, are usually in the neighborhood of 4 meters square per gram ($m^2/g$). On the other hand, the B.E.T. surface of samples of the composite accelerator always have been found to be of at least 6 $m^2/g$, and usually between 7 $m^2/g$ and 8 $m^2/g$.

Highly effective accelerators have been made from low grade land plaster, or native anhydrite, which contained about 18% by weight dihydrate, as well as from high purity dihydrate.

The product and process of this invention will be further illustrated by the following examples but it is to be understood that the examples are illustrative only and are not intended to be limiting.

In the ensuing examples all percentages are by weight unless expressed to the contrary. Reference is made to Vicat set time which is the time during which a 300 gram Vicat needle per ASTM C-472 will freely penetrate of its own weight half-way into the thickness (about 1 inch) of a standard plaster of Paris and water mix in an approximately 6 ounce capacity cup. Reference is also made to temperature which is the number of degrees Fahrenheit rise in temperature from the start of mixing of the plaster and water to the maximum recorded temperature for the exothermic hydration reaction; and further to temperature rise set time (TRS-minutes) which is the elapsed time from mixing to when the maximum temperature rise was reached. The term #/MS' where used denotes pounds per thousand square feet of one-half inch board.

EXAMPLE 1

In a first series of evaluations, a number of samples were prepared in the following manner: 46.5 pounds of land plaster (ground natural gypsum rock dihydrate containing about 75.8% calcium sulfate dihydrate and 16.5% calcium sulfate anhydrite, and having an average Blaine surface area of about 2000-3000 square centimeters per gram) and 3.5 pounds of powdered sugar (sucrose) were milled for 2 hours in a four foot diameter ball mill. After two hours of milling the specific surfaces of the sugar-coated land plaster batches were about 11.500 square centimeters per gram on the average. At this point, 8.9 pounds of aluminum sulfate hydrate having 14-17 molecules of water of hydration per molecule of sulfate were added to each batch, and the milling was continued for one more hour to result in composite accelerators having on average specific surfaces of 10,800 square centimeters per gram. After discharge from the ball mill, aliquots of the samples were combined, screened to minus 50 mesh U.S. Standard and compared with samples prepared in accordance with U.S. Pat. No. 2,078,199.

Figure 1:
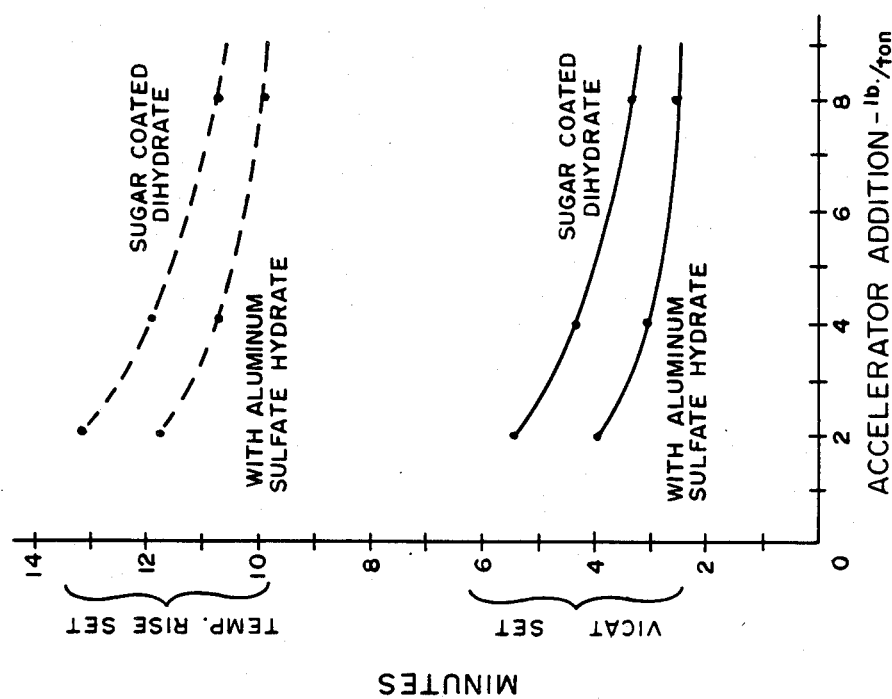
FIG. 1 sets forth representative temperature rise set and Vicat needle set times at various additive levels for a standard sugar-coated dihydrate accelerator and the composite accelerator of this invention.

FIG. 1 sets forth representative set times at various additive levels for a standard sugar-coated dihydrate accelerator and the composite accelerator of this invention prepared as described above. It is apparent at all levels of addition that the composite accelerator of the invention has superior accelerative potency. Any particular level of accelerative effect may be achieved with the composite accelerator with proportionately less addition than the prior art sugar-coated dihydrate accelerator. For example, from FIG. 1, an 11 minute temperature rise set time was accomplished with the sugar-coated dihydrate accelerator at about 6.5 pounds addition per ton of stucco; whereas the composite accelerator accomplished this same temperature rise set time at a level of about 3.4 pounds per ton.

In a second series of evaluations, FIG. 2 sets forth the effect of heat exposure upon the potency of the prior art sugar-coated gypsum accelerator and the composite accelerator of the invention prepared as described above, showing final set time in minutes versus length of exposure in hours at 250° F. The composite accelerator of the invention was dramatically unaffected by these exposures in comparison to the standard sugar-coated gypsum acclerator.

In a further evaluation, samples were prepared by first ball milling natural calcium sulfate anhydrite containing about 18 weight % calcium sulfate dihydrate, with sugar. An aliquot was set aside for testing. A second aliquot was then ball milled further with sufficient aluminum sulfate hydrate to provide a composite accelerator of the invention having a 40 weight % aluminum sulfate hydrate content. A third aliquot was merely stirred together with the same amount of aluminum sulfate hydrate for the same length of time so as to form a physical admixture. Finally, appropriate amounts of each of the anhydrite, sugar, and aluminum sulfate hydrate were simultaneously charged to the ball mill. Representative temperature rise set times for the samples were as follows:

|  | Addition Level | Temperature Rise Set |
|---|---|---|
| Sample 1 - Preground anhydrite ball milled with sugar for 1½ hours | 1 lb./ton | 14.8 minutes |
|  | 2 | 13.8 |
|  | 4 | 12.7 |
|  | 8 | 12.2 |
|  | 16 | 12.0 |
| Sample 2 - 60% Sample #1 re-milled with 40% aluminum sulfate hydrate for 1½ hours | 1.6 | 13.2 |
|  | 3.3 | 12.5 |
|  | 6.6 | 12.2 |
|  | 12.0 | 11.2 |
|  | 16.0 | 10.7 |
| Sample 3 - 60% sample #1 stirred with 40% aluminum sulfate hydrate | 3.3 | 13.7 |
|  | 6.6 | 12.7 |
|  | 13.3 | 11.7 |
| Sample 4 - Simultaneously ball milling for 2 hours: 55% anhydrite; 5% sugar and 40% aluminum sulfate hydrate | 2 | 15.3 |
|  | 4 | 13.7 |
|  | 8 | 12.5 |
|  | 14 | 12.3 |

Sample 2, the composite accelerator of the invention, shows consistent enhancement at all levels in comparison to Sample 1, the sugar-coated only accelerator. Further, Sample 3 shows that merely mixing the aluminum sulfate hydrate without impacting action generally provides insufficiently intimate contact for the aluminum sulfate hydrate and calcium sulfate to stick together and form an intimate association, consolidation or composite.

EXAMPLE 2

In order to correlate the test results shown above with practical gypsum board fabrication, gypsum board was produced on standard factory machinery utilizing the accelerator compositions made in the first evaluation in Example 1. In carrying out this evaluation, standard factory machinery, methods, and formulations were utilized.

Ordinarily this forming equipment required the addition of 17.3 #/MS' of sugar-coated dihydrate accelerator made according to U.S. Pat. No. 2,078,199. A usage reduction schedule to maintain the same line speed was worked out, and a composite accelerator of the invention made in accordance with Example 1 and comprising by weight of the total accelerator composition 6% sucrose, 15% aluminum sulfate hydrate and the remainder being high quality landplaster was substituted for the prior art accelerator. The acelerator addition level was then stepped down until normal board setting parameters were met, at which point accelerator usage of the composite accelerator was 6.1#/MS' (about a 65% reduction in usage requirement). The temperature rise set time at this additional level equaled that of the prior accelerator. Maximum rate of temperature rise improved about 1.5 degrees Fahrenheit per minute, and it was observed that a "sharper, cleaner cut at the knife" (the cutting of the continuous sheet into separate panels prior to entry into the drying ovens) was made on this board in comparison to board made with the prior art accelerator.

In preparing the accelerator compositions according to the invention described above, finely ground land plaster was used. However, if desired, other forms of gypsum may be used including by-product gypsum such as that resulting from the process of manufacturing citric acid.

It is to be understood that the invention is not to be limited to the exact details of operation or compositions shown and described, as obvious modifications and equivalents will be apparent to those skilled in the art. Although in the foregoing description, the accelerator composition of the invention was tested for use in the setting of plaster of Paris slurries, the composite accelerator may alo be used in setting other inorganic cementitious mixtures wherever a gypsum accelerator is utilized, as for example, in industrial gypsum cements containing hydraulic cement such as portland cement. Furthermore, while the coating steps were accomplished in ball impactor type milling operations, it is apparent that other abrasion or attrition apparatus which produce size reduction of the dihydrate particles while in intimate contact and association with the coating materials to achieve fine grinding and coating may be utilized, such as gyratory crushing mills, roll crushers, vibratory and attrition mills, Buhrstone and coffee-grinder type mills, jet mills and flash pulverizing and explosion techniques. Further, while Example 1 utilized multiple passes through a small ball mill it is readily apparent that a single pass through a larger and longer mill may be accomplished with injection or portal entry of the aluminum sulfate hydrate into the middle of the mill partway through a single passage of materials.

What is claimed is:

1. A composite setting accelerator for calcined gypsum plaster which comprises:
   finely ground calcium sulfate dihydrate particles;
   having applied thereover a coating of calcination inhibiting material selected from the group consisting of sugar, glycerine, glycol, starch, anionic detergent, nonionic detergent, lignin, lignosulfonate and mixtures thereof;
   and having applied thereafter aluminum sulfate particles to bring about an intimate consolidation between individual coated dihydrate particles and aluminum sulfate particles.

2. The accelerator of claim 1 in which said first coating consists essentially of sugar.

3. The accelerator of claim 1 in which said aluminum sulfate hydrate has about 14-18 molecules of water of hydration per molecule of aluminum sulfate.

4. The accelerator of claim 1 in which said aluminum sulfate hydrate is papermaker's alum.

5. The accelerator of claim 1 in which said aluminum sulfate hydrate is common alum.

6. The accelerator of claim 1 in which said aluminum sulfate hydrate is present in an amount of from about 5 to about 55% by weight of the total accelerator composition.

7. The acceleraor of claim 1 in which said aluminum sulfate hydrate is present in an amount of from about 10 to about 40% by weight of the total accelerator composition.

8. The set accelerator of claim 1 having a B.E.T. surface area of at least 6 square meters per gram.

9. The set accelerator of claim 1 having a B.E.T. surface area of about 7-8 square meters per gram.

10. The accelerator of claim 1 in which said dihydrate is high purity landplaster.

11. The accelerator of claim 1 in which said dihydrate is low purity landplaster.

12. The accelerator of claim 1 containing about 5-15% by weight of sucrose based on the weight of the dihydrate particle and about 15-40% by weight of the total accelerator composition of aluminum sulfate hydrate having about 14-18 molecules water of hydration per molecule of aluminum sulfate.

13. The accelerator of claim 1 having a Blaine surface area of about 7000 square centimeters per gram.

14. A method of making gypsum wallboard, comprising
   (a) forming a dry accelerator composition comprising finely ground calcium sulfate dihydrate having a coating of sugar and having thereover a consolidation therewith of aluminum sulfate hydrate;
   (b) mixing a minor proportion of said accelerator composition and a major proportion of calcium sulfate hemihydrate with water to form an aqueous slurry;
   (c) depositing said slurry on a surface and permitting said slurry to set, and drying the gypsum wallboard formed thereby.

15. A process for forming a plaster accelerator of high potency comprising
   milling together finely ground calcium sulfate dihydrate and a small amount of a sugar so as to form sugar-coated dihydrate particles;
   and thereafter milling together said sugar-coated dihydrate and a small amount of aluminum sulfate hydrate so as to form a composite of aluminum sulfate hydrate and sugar-coated dihydrate particle.

16. The process of claim 15 including the steps of ball milling together calcium sulfate dihydrate and sugar; and thereafter ball milling together the sugar-coated dihydrate and aluminum sulfate hydrate.

* * * * *